(12) United States Patent
Lee et al.

(10) Patent No.: US 11,891,050 B2
(45) Date of Patent: Feb. 6, 2024

(54) TERMINAL APPARATUS FOR MANAGEMENT OF AUTONOMOUS PARKING, SYSTEM HAVING THE SAME AND METHOD THEREOF

(71) Applicants: Hyundai Motor Company, Seoul (KR); Kia Corporation, Seoul (KR)

(72) Inventors: Sang Hyu Lee, Incheon (KR); Young Chae Ahn, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 130 days.

(21) Appl. No.: 17/527,588

(22) Filed: Nov. 16, 2021

(65) Prior Publication Data
US 2022/0297675 A1 Sep. 22, 2022

(30) Foreign Application Priority Data
Mar. 18, 2021 (KR) .................. 10-2021-0035494

(51) Int. Cl.
*G08G 1/14* (2006.01)
*B60W 30/06* (2006.01)
(Continued)

(52) U.S. Cl.
CPC .......... *B60W 30/06* (2013.01); *G05D 1/0016* (2013.01); *G06F 3/017* (2013.01); *G06F 3/0488* (2013.01); *G06V 20/10* (2022.01); *G06V 40/107* (2022.01); *G06V 40/28* (2022.01); *G08G 1/017* (2013.01); *G08G 1/144* (2013.01); *G05D 2201/0213* (2013.01); *G06V 20/625* (2022.01); *G06V 2201/08* (2022.01)

(58) Field of Classification Search
CPC .......... B60W 30/06; B60W 30/18036; B60W 60/001; B60W 2050/0064; B60W 2300/12; B60W 2420/42; B60W 2520/04; B60W 30/181; B60W 2556/45; B60W 10/20; B60W 2050/0005; G05D 1/0016; G05D 2201/0213; G05D 1/0011; G06F 3/017; G06F 3/0488; G06F 1/1694; G06F 3/0482; G06F 3/04842; G06F 3/0346; G06V 20/10; G06V 40/107; G06V 40/28; G06V 20/625; G06V 2201/08; G08G 1/017; G08G 1/144; G08G 1/096725; G08G 1/168; H04M 1/724098; H04M 1/72415; G06Q 50/30; B60Y 2300/06; B60Y 2300/18033; B60Y 2300/18091; B60Y 2400/304
USPC .................. 340/932.2, 933, 937, 988, 995.1
See application file for complete search history.

(56) References Cited

U.S. PATENT DOCUMENTS

2014/0350855 A1* 11/2014 Vishnuvajhala ......... G07C 1/30
701/538
2016/0368489 A1* 12/2016 Aich ...................... B60W 10/18
(Continued)

*Primary Examiner* — Anh V La
(74) *Attorney, Agent, or Firm* — Fox Rothschild LLP

(57) ABSTRACT

A terminal apparatus for remotely controlling autonomous parking is provided. The autonomous parking managing terminal receives a vehicle control command from a user and transmits the vehicle control command to an autonomous parking managing server. The autonomous parking managing server receives the vehicle control command from the autonomous parking managing terminal and transmits the received vehicle control command to a vehicle. The vehicle performs parking via autonomous driving based on the vehicle control command.

20 Claims, 8 Drawing Sheets

(51) Int. Cl.
  *G08G 1/017* (2006.01)
  *G05D 1/00* (2006.01)
  *G06F 3/01* (2006.01)
  *G06F 3/0488* (2022.01)
  *G06V 20/10* (2022.01)
  *G06V 40/20* (2022.01)
  *G06V 40/10* (2022.01)
  *G06V 20/62* (2022.01)

(56) References Cited

U.S. PATENT DOCUMENTS

2018/0122152 A1* 5/2018 Shin .................... H04W 4/02
2020/0361450 A1* 11/2020 Noguchi ............... G08G 1/146
2021/0110714 A1* 4/2021 Maruiwa ............... G08G 1/149
2021/0253132 A1* 8/2021 Coimbra De Andrade ................
                                        G05D 1/0278

* cited by examiner

| AUTOMATION LEVEL | SAE CLASSIFICATION CRITERIA | SYSTEM ROLE | DRIVER ROLE |
|---|---|---|---|
| LEVEL 0 | NO AUTOMATION | PROVIDING ONLY TEMPORARY EMERGENCY PRINTERVENTIONS OR WARNINGS | DRIVER PERFORMS ALL DRIVING OPERATIONS |
| LEVEL 1 | DRIVER ASSISTANCE | PERFORMING SOME DRIVING FUNCTIONS SUCH AS STEERING AND ACCELERATION/DECELERATION TOGETHER UNDER BOARDING OF DRIVER PERFORMING DRIVING FUNCTION IN NORMAL OPERATION SECTION | DRIVER DETERMINES OPERATING TIME OF LEVEL 1 SYSTEM/WHETHER LEVEL 1 SYSTEM IS OPERATIONAL AND PERFORMS ALL REMAINING OPERATIONS OTHER THAN STEERING WHEEL OR ACCELERATION/DECELERATION PEDAL CONTROL(INCLUDING DRIVING ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORMING DRIVING FUNCTIONS SUCH AS STEERING AND ACCELERATION/DECELERATION INSTEAD OF DRIVER UNDER BOARDING OF DRIVER MONITORING STEERING AND ACCELERATION DECELERATION | DRIVER DETERMINES OPERATING TIME OF SYSTEM/WHETHER SYSTEM IS OPERATIONAL AND PERFORMS ALL REMAINING OPERATIONS OTHER THAN STEERING WHEEL OR ACCELERATION/DECELERATION PEDAL CONTROL(INCLUDING DRIVING ENVIRONMENT/VEHICLE ENVIRONMENT/LEVEL 2 SYSTEM MONITORING AND IMMEDIATE EMERGENCY PREPARATION) |
| LEVEL 3 | CONDITIONAL AUTOMATION | TRANSFERING DRIVING CONTROL RIGHT TO DRIVER AND PERFORMING DRIVING FUNCTIONS SUCH AS STEERING AND ACCELERATION/DECELERATION IN SITUATIONS OTHER THAN CONDITIONS | DRIVER DETERMINES OPERATING TIME OF SYSTEM/WHETHER SYSTEM IS OPERATIONAL AND PERFORMS ALL REMAINING OPERATIONS OTHER THAN STEERING WHEEL OR ACCELERATION/DECELERATION PEDAL CONTROL AND DRIVING ENVIRONMENT MONITORING(IT IS POSSIBLE TO RECEIVE CONTROL RIGHT NECESSARILY AND TO PERFORM EMERGENCY PREPARATION WHEN TRANSFER OF CONTROL RIGHT OF LEVEL 3 SYSTEM IS REQUESTED) |
| LEVEL 4 | HIGH AUTOMATION | PERFORMING ALL DRIVING FUNCTIONS BY SYSTEM UNDER BOARDING OF DRIVER IN EXTREMELY EXCEPTIONAL SITUATIONS | IT IS POSSIBLE TO SELECTIVELY PERFORM EMERGENCY PREPARATION WHEN TRANSFER OF CONTROL RIGHT OF LEVEL 4 SYSTEM IS REQUESTED |
| LEVEL 5 | FULL AUTOMATION | PERFORMING COMPLETE DRIVING FUNCTIONS TO RESPOND TO ALL SITUATIONS WITHOUT DRIVER | DRIVER ONLY DETERMINES WHETHER TO OPERATE SYSTEM AND DOES NOT PERFORM ALL DRIVING OPERATIONS |

FIG. 1

FORWARD CONTROL

STOP CONTROL

LEFT TURN CONTROL

RIGHT TURN CONTROL

TERMINAL APPARATUS FOR MANAGEMENT OF AUTONOMOUS PARKING, SYSTEM HAVING THE SAME AND METHOD THEREOF

CROSS-REFERENCE TO RELATED APPLICATION

This application claims the benefit of priority to Korean Patent Application No. 10-2021-0035494, filed on Mar. 18, 2021, the entire contents of which are incorporated herein by reference.

TECHNICAL FIELD

The present disclosure relates to an autonomous parking managing terminal apparatus, a system having the same, and a method thereof, and more particularly, relates to a terminal apparatus for remotely controlling autonomous parking, a system including the same, and a method thereof.

BACKGROUND

Autonomous driving vehicles require the ability to adaptively respond to surrounding situations that change in real time while driving. First of all, a reliable determination control function is required to produce and activate autonomous driving vehicles. An autonomous vehicle basically performs driving, braking, and steering instead of a driver, thereby reducing the driver's fatigue. Nowadays, the autonomous vehicle may be equipped with a highway driving assist (HDA) function, a driver status warning (DSW) function that outputs a warning alarm via a cluster, or the like by determining status abnormalities and the driver's negligence such as drowsy driving and eye deviation, a driver awareness warning (DAW) function that determines whether a vehicle is unsafely driving while crossing the lane, via a front camera, and a forward collision-avoidance assist (FCA) or active emergency brake system (AEBS) function that performs sudden braking when a forward collision is detected; and, the autonomous vehicle may be on sale.

Logistics trucks require precise parking for loading and unloading cargo. Likewise, when autonomous trucks enter a hub, there is a need for precise parking within the hub. Accordingly, it is necessary to develop a technology for enabling parking without boarding of a driver (switching to a manual operation) even in exceptional or emergency situations until parking is completed on a parking surface in a parking situation in the hub.

SUMMARY

The present disclosure has been made to solve the above-mentioned problems occurring in the prior art while advantages achieved by the prior art are maintained intact. An aspect of the present disclosure provides a terminal apparatus for remotely controlling autonomous parking, a system including the same, and a method thereof. An aspect of the present disclosure provides an autonomous parking managing terminal apparatus for controlling precise parking in a hub of an autonomous driving truck, a system including the same, and a method thereof.

Another aspect of the present disclosure provides an autonomous parking managing terminal apparatus, which is capable of completing parking without switching to manual operation or boarding a driver even in arbitrary or emergency situations during parking, a system including the same, and a method thereof. An aspect of the present disclosure provides an autonomous parking managing terminal apparatus that maximally reduces transportation costs by minimizing the driver's boarding during autonomous parking of an autonomous driving truck in a hub, a system including the same, and a method thereof.

Another aspect of the present disclosure provides an autonomous parking managing terminal apparatus that automates parking of autonomous driving trucks based on vision or communication in a restricted area (space without dependence on map/GPS signals), a system including the same, and a method thereof. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous parking managing terminal apparatus may include a communication circuit configured to communicate with an autonomous parking managing server and a processor configured to receive a control right request for a vehicle from a user, transmit the control right request for the vehicle to the autonomous parking managing server via the communication circuit, receive approval for the control right request from the autonomous parking managing server, receive a vehicle control command from the user, and transmit the vehicle control command to the autonomous parking managing server via the communication circuit.

In an embodiment, the apparatus may further include a camera. The processor may be configured to extract a vehicle number from an image of the vehicle, which is captured by the user via the camera, and receive the control right request for the vehicle corresponding to the vehicle number. The processor may be configured to receive a target location, to which the vehicle is to be moved on a map, from the user and transmit information about the target location to the autonomous parking managing server via the communication circuit.

The apparatus may further include a touch screen. The processor may be configured to receive one or more of a tap or a swipe from the user via the touch screen and transmit the vehicle control command corresponding to one or more of the received tap or the received swipe to the autonomous parking managing server via the communication circuit. In addition, the apparatus may further include an acceleration sensor. The processor may be configured to detect a hand signal of the user based on acceleration obtained via the acceleration sensor and transmit the vehicle control command corresponding to the hand signal to the autonomous parking managing server via the communication circuit. The vehicle control command may include a control command corresponding to one or more of forward control, reverse control, steering control, and stop control.

According to an aspect of the present disclosure, an autonomous parking managing system may include an autonomous parking managing terminal configured to receive a vehicle control command from a user and transmit the vehicle control command to an autonomous parking managing server, the autonomous parking managing server configured to receive the vehicle control command from the autonomous parking managing terminal and transmit the received vehicle control command to a vehicle, and the vehicle configured to execute parking via autonomous driving based on the vehicle control command.

In an embodiment, the autonomous parking managing terminal may be configured to transmit a control right request for the vehicle, which is received from the user, to the autonomous parking managing server, and activate an input of the vehicle control command from the user when receiving approval for the control right request from the autonomous parking managing server. The autonomous parking managing server may be configured to transmit the control right request received from the autonomous parking managing terminal to the vehicle, and transmit approval for the control right request received from the vehicle to the parking managing terminal.

In addition, the autonomous parking managing terminal may be configured to extract a vehicle number from an image of the vehicle, which is captured by the user via a camera, and receive the control right request for the vehicle corresponding to the vehicle number. The autonomous parking managing terminal may be configured to receive a target location, to which the vehicle is moved on a map, from the user and transmit information about the target location to the autonomous parking managing server. In addition, the autonomous parking managing terminal may be configured to receive one or more of a tap or a swipe from the user via a touch screen, and transmit the vehicle control command corresponding to one or more of the received tap or the received swipe to the autonomous parking managing server.

In an embodiment, the autonomous parking managing terminal may be configured to detect a hand signal of the user based on acceleration obtained via an acceleration sensor, and transmit the vehicle control command corresponding to the hand signal to the autonomous parking managing server. The vehicle control command may include a control command corresponding to one or more of forward control, reverse control, steering control, and stop control. In addition, the vehicle may be configured to receive the control right request from the autonomous parking managing server, transmit approval for the control right request to the autonomous parking managing server, and enter a state of waiting for the vehicle control command.

According to an aspect of the present disclosure, an autonomous parking managing method may include receiving, by an autonomous parking managing terminal, a vehicle control command from a user and transmitting the vehicle control command to an autonomous parking managing server, receiving, by the autonomous parking managing server, the vehicle control command from the autonomous parking managing terminal and transmitting the received vehicle control command to a vehicle, and performing, by the vehicle, parking via autonomous driving based on the vehicle control command.

In an embodiment, the method may further include transmitting, by the autonomous parking managing terminal, a control right request for the vehicle, which is received from the user, to the autonomous parking managing server, transmitting, by the autonomous parking managing server, the control right request received from the autonomous parking managing terminal to the vehicle, transmitting, by the autonomous parking managing server, approval for the control right request received from the vehicle to the parking managing terminal, and when the autonomous parking managing terminal receives the approval for the control right request from the autonomous parking managing server, activating, by the autonomous parking managing terminal, an input of the vehicle control command from the user.

The method may further include extracting, by the autonomous parking managing terminal, a vehicle number from an image of the vehicle, which is captured by the user via a camera and receiving the control right request for the vehicle corresponding to the vehicle number. In addition, the method may further include receiving, by the autonomous parking managing terminal, a target location, to which the vehicle is to be moved on a map, from the user and transmitting information about the target location to the autonomous parking managing server.

In an embodiment, the receiving, by the autonomous parking managing terminal, of the vehicle control command from the user and transmitting the vehicle control command to the autonomous parking managing server may include receiving, by the autonomous parking managing terminal, one or more of a tap or a swipe from the user via a touch screen and transmitting the vehicle control command corresponding to one or more of the received tap or the received swipe to the autonomous parking managing server.

Further, the receiving, by the autonomous parking managing terminal, of the vehicle control command from the user and transmitting the vehicle control command to the autonomous parking managing server may include detecting a hand signal of the user based on acceleration obtained via an acceleration sensor and transmitting the vehicle control command corresponding to the hand signal to the autonomous parking managing server.

BRIEF DESCRIPTION OF THE DRAWINGS

The above and other objects, features and advantages of the present disclosure will be more apparent from the following detailed description taken in conjunction with the accompanying drawings:

FIG. 1 is a table, in which an automation level of an autonomous driving vehicle is defined;

DETAILED DESCRIPTION

Figure 2:
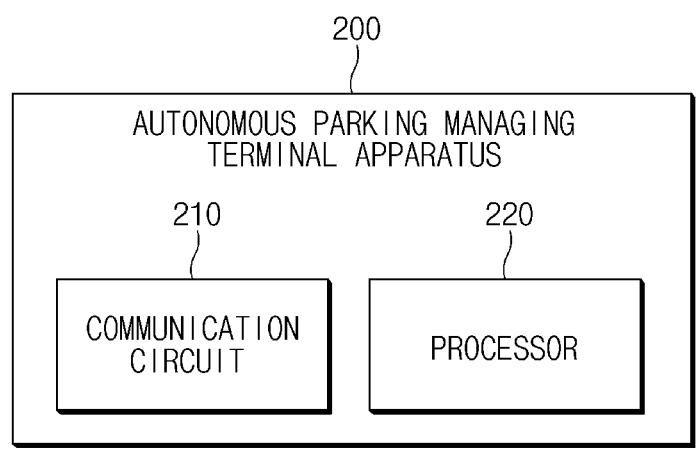
FIG. 2 is a block diagram illustrating an autonomous parking managing terminal apparatus, according to an embodiment of the present disclosure.

Hereinafter, exemplary embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of the present disclosure unnecessarily obscure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 8. FIG. 1 is a table, in which an automation level of an autonomous driving vehicle is defined. An autonomous driving vehicle refers to a vehicle that determines dangers by recognizing a driving environment by itself, minimizes driving operations of a driver while controlling driving routes, and drives itself. Eventually, the autonomous driving vehicle means a vehicle capable of driving, manipulating, and parking without a driver's intervention. In addition, the autonomous driving vehicle is focused on a vehicle in which autonomous driving technology (i.e., the capability to drive a vehicle without a driver's active control or monitoring) being the core of the autonomous driving vehicle has been developed to the highest level.

However, as illustrated in FIG. 1, the concept of a current autonomous driving vehicle may include the automation step of a middle step to achieve a full-autonomous driving vehicle, and may correspond to a goal-oriented concept presupposing mass production and commercialization of a full-autonomous driving vehicle.

According to an embodiment of the present disclosure, an autonomous driving control method may be applied to an autonomous driving vehicle corresponding to level 3 (conditional automation) among the autonomous driving steps illustrated in FIG. 1, but not limited thereto. The autonomous driving control method may be applied to any level of autonomous vehicle that requires the transfer of control right and vehicle control depending on system failure during autonomous driving.

The automation level of an autonomous driving vehicle based on Society Automotive Engineers (SAE) that is American Automotive Engineers Association may be classified as illustrated in a table of FIG. 1. FIG. 2 is a block diagram illustrating an autonomous parking managing terminal apparatus, according to an embodiment of the present disclosure. Referring to FIG. 2, an autonomous parking managing terminal apparatus 200 may include a communication circuit 210 and a processor 220.

Although not illustrated in FIG. 2, the autonomous parking managing terminal apparatus 200 may further include one or more of a camera (e.g., or video capturing device), a touch screen, or an acceleration sensor. For example, the autonomous parking managing terminal apparatus 200 may include a communication terminal of a parking manager. For example, the autonomous parking managing terminal apparatus 200 may include a mobile phone or smartphone of the parking manager. The parking manager may enter a function for managing autonomous parking via an application installed in the autonomous parking managing terminal apparatus 200.

The communication circuit 210 may be configured to communicate with an autonomous parking managing server. For example, the communication circuit 210 may be configured to communicate with an external device; the communication circuit 210 may be electrically connected to the processor 220 to deliver the received information to the processor 220; the communication circuit 210 may be configured to receive information, which is to be transmitted to the external device, from the processor 220; and, the communication circuit 210 may be operated by the processor 220.

The processor 220 may be electrically connected to the communication circuit 210, a camera, a touch screen, an accelerometer, or the like, may electrically control each of the components, may be an electrical circuit that executes the instructions of the software, and may perform various data processing and calculation described below. The processor 220 may be connected to the communication circuit 210, the camera, the touch screen, the accelerometer, and the like via wireless or wired communication, and may be configured to directly or indirectly transmit and receive various information or signals.

The processor 220 may be configured to receive a control right request for a vehicle from a user and then transmit the control right request for the vehicle to the autonomous parking managing server via the communication circuit 210. The processor 220 may be configured to extract a vehicle number from a vehicle image, which is captured by the user via the camera, and then receive the control right request for the vehicle corresponding to the vehicle number. For example, the processor 220 may be configured to receive the control right request for a specific vehicle via a user Interface (UI) of a mobile phone application.

For example, after receiving the control right request while a vehicle is not specified, the processor 220 may be configured to extract a vehicle number via image analysis from the vehicle image captured via the camera and then transmit the control right request for the vehicle specified in response to the extracted vehicle number to the autonomous parking managing server. The processor 220 may be configured to receive approval for the control right request from the autonomous parking managing server. For example, the processor 220 may be configured to receive the approval for the control right request from the autonomous parking managing server via the communication circuit 210.

The processor 220 may be configured to receive a vehicle control command from the user and transmit the vehicle control command to the autonomous parking managing server via the communication circuit 210. For example, the vehicle control command may include a control command corresponding to one or more of forward control, reverse control, steering control, and stop control. For example, the processor 220 may be configured to receive the vehicle control command from a user via a touch screen or an accelerometer. The processor 220 may be configured to receive one or more of a tap and a swipe from the user via a touch screen, and then transmit the vehicle control command corresponding to one or more of the received tap or the received swipe to the autonomous parking managing server via the communication circuit 210.

A process in which the processor 220 receives a vehicle control command from a user via a touch screen will be described in detail with reference to FIG. 5. The processor 220 may be configured to receive a target location, to which a vehicle is to be moved on a map, from the user, and then transmit information about the target location to the autonomous parking managing server via the communication circuit 210. For example, the processor 220 may be configured to receive, from the user, a point at which the vehicle is to be parked on the map displayed on a screen via a mobile phone application, and then transmit information about the received point to the autonomous parking managing server.

For example, the autonomous parking managing server may use information about a parking target location in a process of managing the vehicle's autonomous parking, and may be configured to transmit the information about the parking target location to the vehicle. The processor 220 may be configured to detect the user's hand signal based on the acceleration obtained via the acceleration sensor and then transmit a vehicle control command corresponding to the hand signal to the autonomous parking managing server via the communication circuit 210.

For example, the processor 220 may be configured to detect the hand signal corresponding to the acceleration obtained via the acceleration sensor, by comparing the acceleration obtained via the acceleration sensor with an acceleration pattern, which is stored in the memory in advance and which corresponds to the hand signal. Moreover, the processor 220 may be configured to generate the vehicle control command corresponding to the detected hand signal and then transmit the generated vehicle control command to the autonomous parking managing server via the communication circuit 210.

Figure 3:
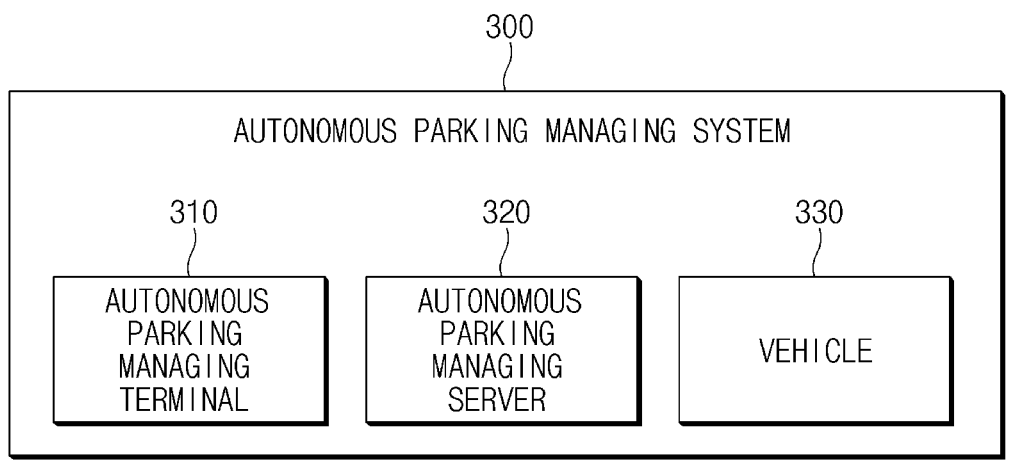
FIG. 3 is a block diagram illustrating an autonomous parking managing system, according to an embodiment of the present disclosure.

A vehicle control command corresponding to a hand signal will be described in detail with reference to FIGS. 6A-6D. FIG. 3 is a block diagram illustrating an autonomous parking managing system, according to an embodiment of the present disclosure. Referring to FIG. 3, an autonomous parking managing system 300 may include an autonomous parking managing terminal 310, an autonomous parking managing server 320, and a vehicle 330. For example, the autonomous parking managing system 300 may include a system for managing autonomous parking within a hub where autonomous trucks for transport of cargo are parked.

The autonomous parking managing terminal 310 may be configured to transmit a control right request for a vehicle received from a user to the autonomous parking managing server 320. When receiving approval for the control right request from the autonomous parking managing server 320, the autonomous parking managing terminal 310 may be configured to activate an input of a vehicle control command from the user. The autonomous parking managing terminal 310 may be configured to extract a vehicle number from an vehicle image captured by the user via a camera and then receive the control right request for a vehicle corresponding to the vehicle number.

Additionally, the autonomous parking managing terminal 310 may be configured to receive a vehicle control command from the user and transmit the vehicle control command to the autonomous parking managing server 320. For example, the autonomous parking managing terminal 310 may be configured to receive the vehicle control command from the user via UI of the mobile phone application. For example, the vehicle control command may include a control command corresponding to one or more of forward control, reverse control, steering control, and stop control.

The autonomous parking managing terminal 310 may be configured to receive a target location, to which a vehicle is to be moved on a map, from the user, and then transmit information about the target location to the autonomous parking managing server 320. The autonomous parking managing terminal 310 may be configured to receive one or more of a tap and a swipe from the user via a touch screen, and then transmit the vehicle control command corresponding to one or more of the received tap or the received swipe to the autonomous parking managing server 320. The autonomous parking managing terminal 310 may be configured to detect the user's hand signal based on the acceleration obtained via an acceleration sensor and then transmit a vehicle control command corresponding to the hand signal to the autonomous parking managing server 320.

The detailed description of the autonomous parking managing terminal 310 is the same as that of the autonomous parking managing terminal apparatus 200 of FIG. 2, and thus additional description will be omitted to avoid redundancy. The autonomous parking managing server 320 may include a communication module configured to communicate with the autonomous parking managing terminal 310 and the vehicle 330, and may be configured to transmit and receive various information and signals with the autonomous parking managing terminal 310 and the vehicle 330 via the communication module. For example, the autonomous parking managing server 320 may include a server of a parking information center in a hub.

The autonomous parking managing server 320 may be configured to receive a vehicle control command from the autonomous parking managing terminal 310 and transmit the received vehicle control command to the vehicle 330. In addition, the autonomous parking managing server 320 may be configured to transmit a control right request, which is received from the autonomous parking managing terminal 310, to the vehicle 330 and then transmit the approval for the control right request, which is received from the vehicle 330, to the autonomous parking managing terminal 310.

In other words, the autonomous parking managing server 320 may be a management server for overall control of the autonomous parking of the vehicle 330 based on a command entered via the autonomous parking managing terminal 310. The autonomous parking managing server 320 may be configured to record and store pieces of information thus transmitted and received, in a memory. In case of emergency, the autonomous parking managing server 320 may be configured to perform the role of a server capable of managing a process of controlling or operating the vehicle 330.

The vehicle 330 may include a communication module that communicates with the autonomous parking managing server 320, and may be configured to transmit and receive various information and commands via the communication module. For example, the vehicle 330 may include an autonomous truck that is parked in a hub. The vehicle 330 may be configured to receive a control right request (e.g., vehicle control request) from the autonomous parking managing server 320 and transmit approval for the control right request to the autonomous parking managing server 320. For example, when the vehicle 330 receives a control right request from the autonomous parking managing server 320, the vehicle 330 may be configured to determine whether it is possible to approve the control right request. In response to determining that it is possible to approve the control right request, the vehicle 330 may be configured to transmit the approval for the control right request to the autonomous parking managing server 320.

The vehicle 330 may be configured to receive a vehicle control command from the autonomous parking managing server 320. The vehicle 330 may be configured to perform parking via autonomous driving based on the vehicle control command. For example, the vehicle 330 may include an autonomous driving system for performing autonomous driving. For example, the vehicle 330 may perform autonomous driving via a forward command, a reverse command, a steering command, and a stop command based on the vehicle control command.

Figure 4:
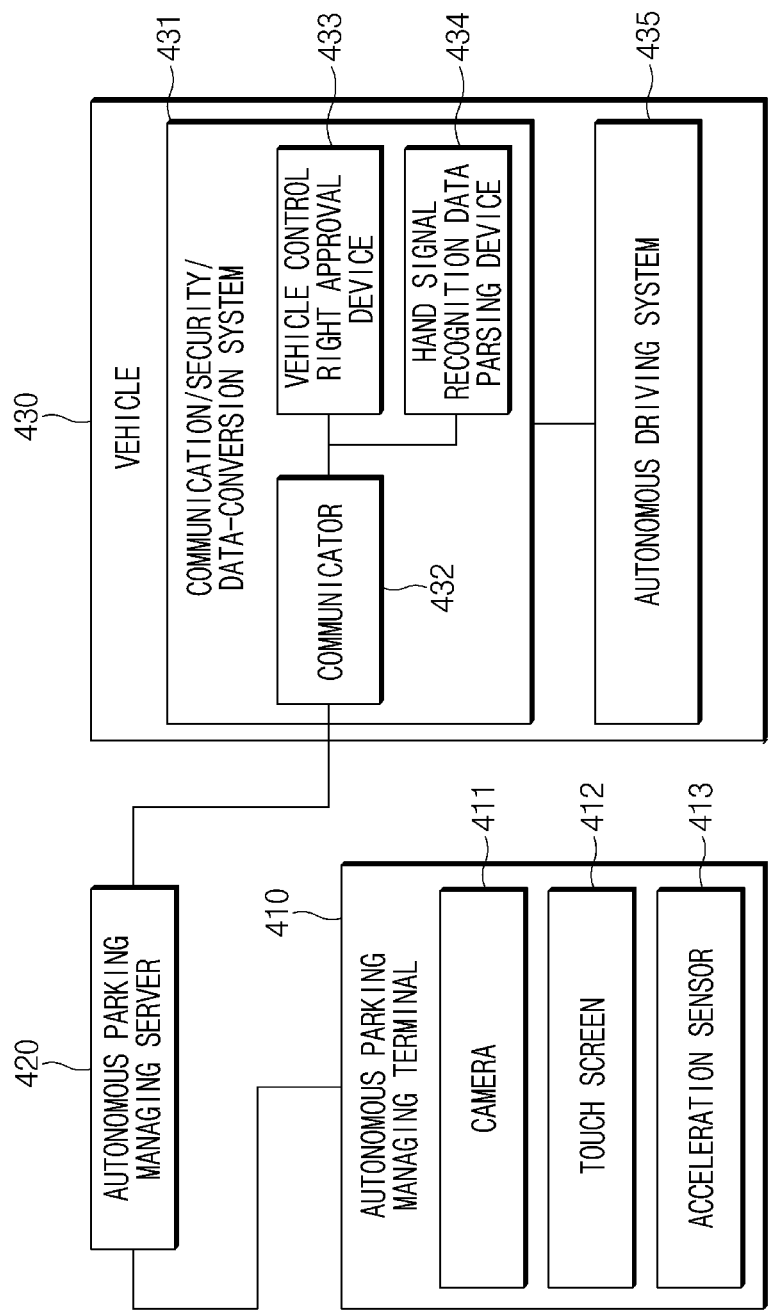
FIG. 4 is a diagram specifically illustrating an autonomous parking managing system, according to an embodiment of the present disclosure.

FIG. 4 is a diagram specifically illustrating an autonomous parking managing system, according to an embodiment of the present disclosure. Referring to FIG. 4, an autonomous parking managing system may include an autonomous parking managing terminal 410, an autonomous parking managing server 420, and a vehicle 430.

The autonomous parking managing terminal 410 may include a camera 411, a touch screen 412, and an acceleration sensor 413. The autonomous parking managing terminal 410 may be configured to receive various information or commands from a user via a user interface (UI) of a mobile phone application and output information via the touch screen 412. For example, the autonomous parking managing terminal 410 may be configured to capture an image of the vehicle 430 via the camera 411, and execute image capturing of the vehicle 430 via the mobile phone application.

For example, the autonomous parking managing terminal 410 may be configured to receive a command from the user via the touch screen 412. Specifically, the autonomous parking managing terminal 410 may be configured to receive a command to move a vehicle via a tap or a swipe. For example, the autonomous parking managing terminal 410 may be configured to obtain the acceleration of the autonomous parking managing terminal 410 via the acceleration sensor 413. When the user makes a hand signal while holding the autonomous parking managing terminal 410 in his/her hand, the autonomous parking managing terminal 410 may be configured to detect the hand signal based on the obtained acceleration.

The autonomous parking managing terminal 410 may include a communication module, and may be configured to communicate with the autonomous parking managing server 420 via the communication module. For example, the autonomous parking managing terminal 410 may be configured to transmit a control right request, a vehicle control command, or the like to the autonomous parking managing server 420 via the communication module, and may be configured to receive approval for the control right request from the autonomous parking managing server 420.

The autonomous parking managing server 420 may include a communication module and may communicate with the autonomous parking managing terminal 410 and the vehicle 430 via the communication module. For example, the autonomous parking managing server 420 may be configured to receive a control right request, a vehicle control command, or the like from the autonomous parking managing terminal 410, and may be configured to receive the approval for a control right request from the vehicle 430. For example, the autonomous parking managing server 420 may be configured to transmit a control right request, a vehicle control command, or the like to the vehicle 430, and may be configured to transmit the approval for a control right request to the autonomous parking managing terminal 410.

The vehicle 430 may include a communication/security/data-conversion system 431 and an autonomous driving system 435. The communication/security/data-conversion system 431 may include a communicator 432, a vehicle control right approval device 433, and a hand signal recognition data parsing device 434. The vehicle 430 may be configured to communicate with the autonomous parking managing server 420 via the communicator 432 to transmit and receive various information and commands. For example, the communicator 432 may be configured to receive a control right request, a vehicle control command, or the like from the autonomous parking managing server 420, and transmit the approval for the control right request to the autonomous parking managing server 420.

The communicator 432 may be directly or indirectly connected to the vehicle control right approval device 433 and the hand signal recognition data parsing device 434 via wireless or wired communication to transmit and receive information. For example, the communicator 432 may be configured to transmit a control right request received from the autonomous parking managing server 420 to the vehicle control right approval device 433, transmit a vehicle control command received from the autonomous parking managing server 420 to the hand signal recognition data parsing device 434, and transmit approval for a control right request received from the vehicle control right approval device 433 to the autonomous parking managing server 420.

When the vehicle control right approval device 433 receives the vehicle control right request, the vehicle control right approval device 433 may be configured to determine whether it is possible to approve the vehicle control right request. In response to determining that it is possible to approve the control right request, the vehicle control right approval device 433 may be configured to transmit the approval for the control right request to the autonomous parking managing server 420 via the communicator 432. For example, the vehicle control right approval device 433 may be configured to determine whether it is possible to approve the vehicle control right request received from the autonomous driving system 435 based on whether autonomous driving is currently possible.

The hand signal recognition data parsing device 434 may be configured to receive information about the acceleration or hand signal detected by the autonomous parking managing terminal 410, analyze information about the acceleration or hand signal, may output a vehicle control signal corresponding to the information, and transmit the vehicle control signal to the autonomous driving system 435. The autonomous driving system 435 may include a system that controls overall autonomous driving of the vehicle 430.

The autonomous driving system 435 may be configured to receive a vehicle control command from the communication/security/data-conversion system 431 and perform autonomous driving control of the vehicle 430 corresponding to the vehicle control command. For example, the autonomous driving system 435 may be configured to perform autonomous driving control including one or more of forward control, reverse control, steering control, or stop control.

Figure 5:
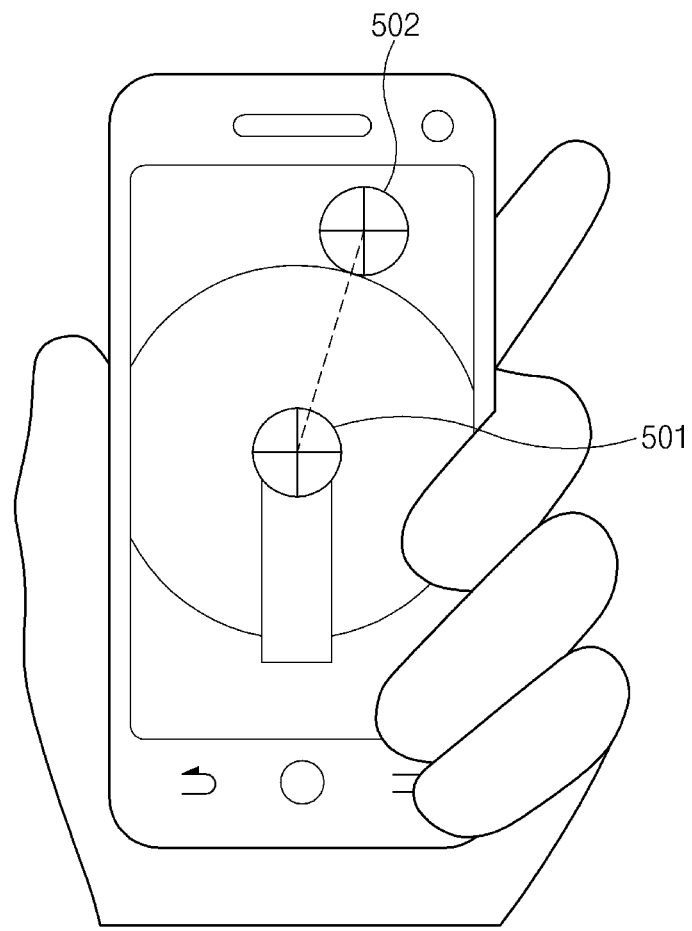
FIG. 5 is a view illustrating a touch screen of an autonomous parking managing terminal apparatus, according to an embodiment of the present disclosure.

FIG. 5 is a view illustrating a touch screen of an autonomous parking managing terminal apparatus, according to an embodiment of the present disclosure. Referring to FIG. 5, the autonomous parking managing terminal apparatus 200 may be configured to display a vehicle and a circle of a specific radius that is drawn with respect to a center 501 of the vehicle, on a touch screen via a mobile phone application.

The autonomous parking managing terminal apparatus 200 may be configured to receive a tap or a swipe from a user via the touch screen. For example, the autonomous parking managing terminal apparatus 200 may be configured to detect that a user taps the center 501 of the vehicle and then taps a target point 502 to which the vehicle is to be moved, via the touch screen. As another example, the autonomous parking managing terminal apparatus 200 may be configured to detect that the user swipes with the center 501 of the vehicle, which is a starting point, and the target point 502, to which the vehicle is to be moved and which is an end point, via the touch screen. The autonomous parking managing terminal apparatus 200 may be configured to generate a vehicle control command to move the vehicle from the center 501 of the vehicle to the target point 502, to which the vehicle is to be moved, based on a tap or a swipe detected via the touch screen.

The autonomous parking managing terminal apparatus 200 may be configured to transmit the generated vehicle control command to the autonomous parking managing server. The autonomous parking managing server may be configured to transmit the received vehicle control command to the vehicle. The vehicle may move to a location corresponding to the target point 502, to which the vehicle is to be moved, by performing autonomous driving control depending on the received vehicle control command.

FIGS. 6A-6D are diagrams illustrating a vehicle control command corresponding to a hand signal, according to an embodiment of the present disclosure. Referring to FIGS. 6A-6D, a vehicle control command corresponding to a hand signal may include one or more of forward control, stop control, left turn control, and right turn control.

Figure 6A:
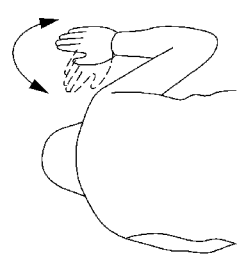
FIGS. 6A-6D are diagrams illustrating a vehicle control command corresponding to a hand signal, according to an embodiment of the present disclosure.

A hand signal shown in FIG. 6A may represent a hand signal indicating shaking a hand back and forth in a state where a user has his/her palm facing forward while holding the autonomous parking managing terminal apparatus 200 in his/her hand. The autonomous parking managing terminal apparatus 200 may be configured to compare acceleration obtained when the user shakes a hand back and forth in a state where a user has his/her palm facing forward while holding the autonomous parking managing terminal apparatus 200 in his/her hand, with information about the obtained acceleration pattern, which is stored in memory in advance. The autonomous parking managing terminal apparatus 200 may be configured to determine whether the user's hand signal is a hand signal corresponding to the forward control.

Figure 6B:

A hand signal shown in FIG. 6B may represent a hand signal indicating raising a hand up and then stopping the hand in a state where the user has his/her palm facing forward while holding the autonomous parking managing terminal apparatus 200 in his/her hand. The autonomous parking managing terminal apparatus 200 may be configured to compare acceleration obtained when the user raises his/her hand up and then stops his/her hand in a state where a user has his/her palm facing forward while holding the autonomous parking managing terminal apparatus 200 in his/her hand, with information about the obtained acceleration pattern, which is stored in memory in advance. The autonomous parking managing terminal apparatus 200 may be configured to determine whether the user's hand signal is a hand signal corresponding to the stop control.

Figure 6C:
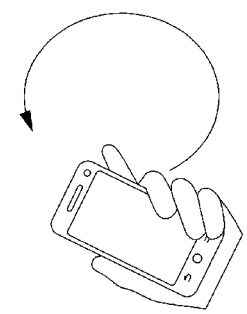

A hand signal shown in FIG. 6C may represent a hand signal indicating drawing a circle with a hand in a counterclockwise direction in a state where a user has his/her palm facing forward while holding the autonomous parking managing terminal apparatus 200 in his/her hand. The autonomous parking managing terminal apparatus 200 may be configured to compare acceleration obtained when the user draws a circle with his/her hand in a counterclockwise direction in a state where a user has his/her palm facing forward while holding the autonomous parking managing terminal apparatus 200 in his/her hand, with information about the obtained acceleration pattern, which is stored in memory in advance. The autonomous parking managing terminal apparatus 200 may be configured to determine whether the user's hand signal is a hand signal corresponding to the left turn control.

Figure 6D:
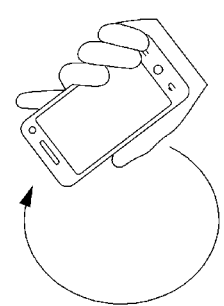

A hand signal shown in FIG. 6D may represent a hand signal indicating drawing a circle with a hand in a clockwise direction in a state where a user has his/her palm facing forward while holding the autonomous parking managing terminal apparatus 200 in his/her hand. The autonomous parking managing terminal apparatus 200 may be configured to compare acceleration obtained when the user draws a circle with his/her hand in a clockwise direction in a state where a user has his/her palm facing forward while holding the autonomous parking managing terminal apparatus 200 in his/her hand, with information about the obtained acceleration pattern, which is stored in memory in advance. The autonomous parking managing terminal apparatus 200 may be configured to determine whether the user's hand signal is a hand signal corresponding to the right turn control. The vehicle control commands corresponding to the hand signals in FIGS. 6A-6D are obtained by matching an exemplarily-used hand signals with vehicle control commands. In fact, for convenience of description, hand signals and vehicle control commands may be matched differently from the example.

Figure 7:
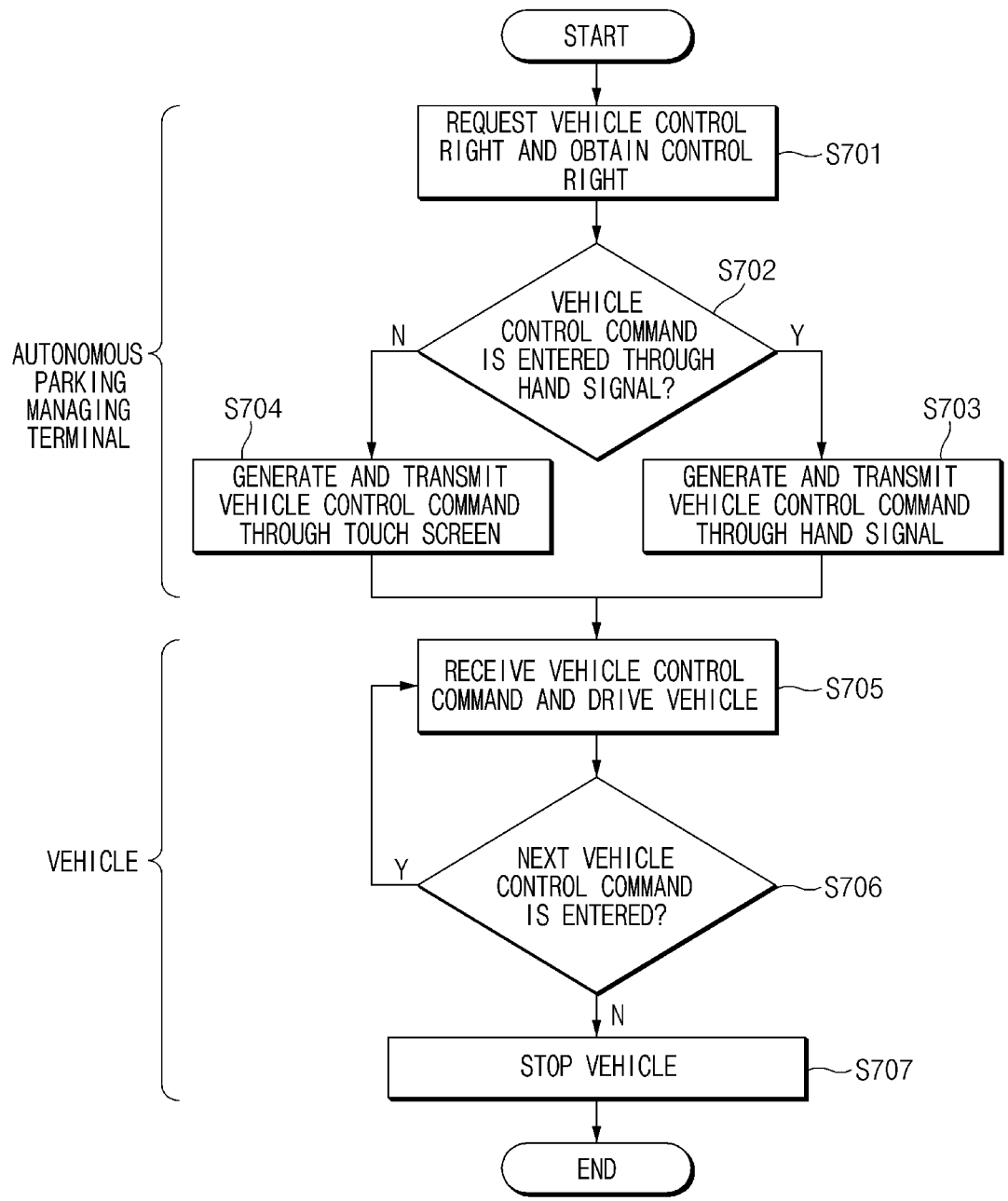
FIG. 7 is a flowchart illustrating an autonomous parking managing method, according to an embodiment of the present disclosure.

FIG. 7 is a flowchart illustrating an autonomous parking managing method, according to an embodiment of the present disclosure. The method described herein below may be executed by the processor. Referring to FIG. 7, the autonomous parking managing terminal 310 may be configured to request a vehicle control right and may obtain the control right (S701). For example, the autonomous parking managing terminal 310 may be configured to receive the control right request for the vehicle 330 from a user and then transmit the control right request to the autonomous parking managing server 320. Afterward, the autonomous parking managing server 320 may be configured to transmit the control right request to the vehicle 330. The vehicle 330 may be configured to determine whether to approve the control right request and transmit the approval for the control right request to the autonomous parking managing server 320. The autonomous parking managing server 320 may be configured to transmit the approval for the control right request to the autonomous parking managing terminal 310.

The autonomous parking managing terminal 310 may be configured to request a vehicle control right and then may obtain the control right (S701). Afterward, the autonomous parking managing terminal 310 may be configured to determine whether the vehicle control command is entered via a hand signal (S702). For example, the autonomous parking managing terminal 310 may be configured to determine whether a user enters a vehicle control command via a hand signal, based on the acceleration obtained via an acceleration sensor, or receive a method in which the user enters a vehicle control command via a mobile phone application UI.

The autonomous parking managing terminal 310 may be configured to determine whether the vehicle control command is entered via the hand signal. (S702). When it is identified that the vehicle control command is entered via the hand signal, the autonomous parking managing terminal 310 may be configured to generate a vehicle control command via a hand signal, and then transmit the vehicle control command to the autonomous parking managing server 320 (S703). For example, in response to identifying that the vehicle control command is entered via the hand signal, the autonomous parking managing terminal 310 may be configured to analyze acceleration obtained via an acceleration sensor and then generate a vehicle control command corresponding to the acceleration. In addition, the autonomous parking managing terminal 310 may be configured to transmit the generated vehicle control command to the autonomous parking managing server 320.

The autonomous parking managing terminal 310 may be configured to generate a vehicle control command via a hand signal and then transmit the vehicle control command to the autonomous parking managing server 320 (S703). The vehicle 330 may be configured to receive a vehicle control command from the autonomous parking managing server 320 and then be driven (S705). For example, the autonomous parking managing terminal 310 may be configured to generate a vehicle control command via a hand signal, and then transmit the vehicle control command to the autonomous parking managing server 320. Afterward, the autonomous parking managing server 320 may be configured to transmit the vehicle control command to the vehicle 330. The vehicle 330 may be configured to perform autonomous driving based on the vehicle control command received from the autonomous parking managing server 320.

The autonomous parking managing terminal 310 may be configured to determine whether the vehicle control command is entered via the hand signal (S702). In response to identifying that the vehicle control command is not entered via the hand signal, the autonomous parking managing terminal 310 may be configured to generate a vehicle control command via a touch screen, and then transmit the vehicle control command to the autonomous parking managing server 320 (S704). For example, in response to identifying that the vehicle control command is not entered via the hand signal, the autonomous parking managing terminal 310 may be configured to generate a vehicle control command corresponding to a tap or swipe by analyzing information about the tap or swipe entered via the touch screen, and then transmit the generated vehicle control command to the autonomous parking managing server 320.

The autonomous parking managing terminal 310 may be configured to generate a vehicle control command via the touch screen and then transmit the vehicle control command to the autonomous parking managing server 320 (S704). The vehicle 330 may be configured to receive a vehicle control command from the autonomous parking managing server 320 and may be driven (S705). For example, the autonomous parking managing terminal 310 may be configured to generate a vehicle control command via the touch screen and then transmit the vehicle control command to the autonomous parking managing server 320. Afterward, the autonomous parking managing server 320 may be configured to transmit the vehicle control command to the vehicle 330. The vehicle 330 may be configured to perform autonomous driving based on the vehicle control command received from the autonomous parking managing server 320.

The vehicle 330 may be configured to receive the vehicle control command from the autonomous parking managing server 320 and then may be driven (S705). Afterward, the vehicle 330 may be configured to determine whether the next vehicle control command is entered (S706). The vehicle 330 may be configured to determine whether the next vehicle control command is entered (S706). In response to identifying that the next vehicle control command is entered, the vehicle 330 may return to a process of S705 again. In other words, the vehicle 330 may be configured to receive the vehicle control command from the autonomous parking managing server 320 and then may be driven. The vehicle 330 may be configured to determine whether the next vehicle control command is entered (S706). Afterward, in response to identifying that the next vehicle control command is not entered, the vehicle 330 may be stopped (S707).

Figure 8:
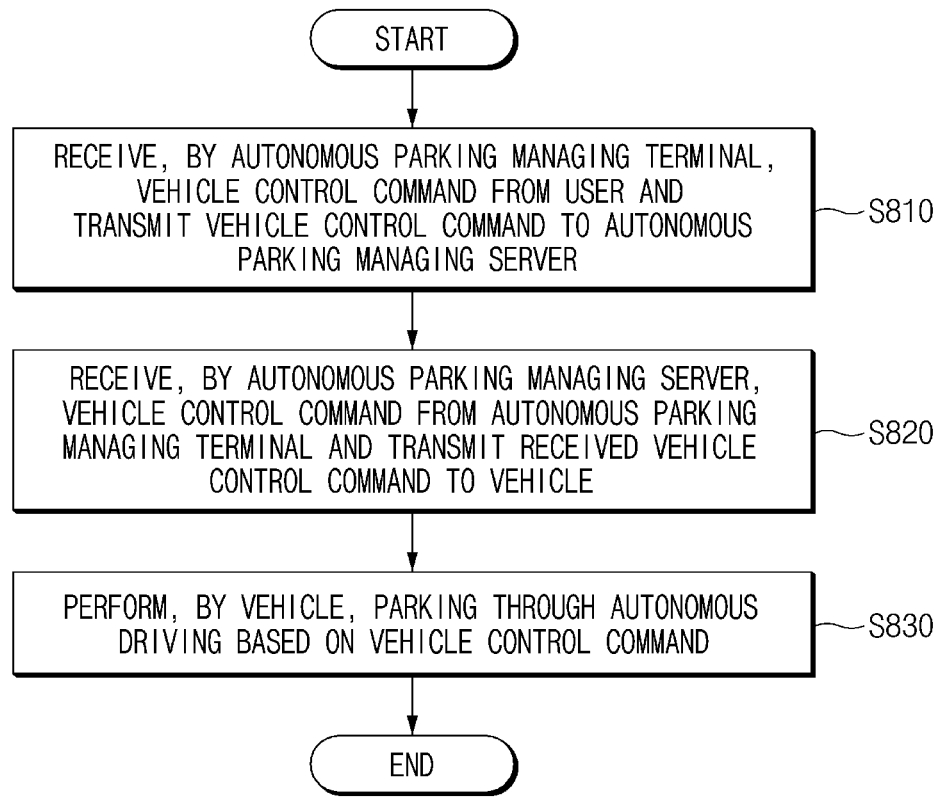
FIG. 8 is a flowchart illustrating an autonomous parking managing method, according to another embodiment of the present disclosure.

FIG. 8 is a flowchart illustrating an autonomous parking managing method, according to another embodiment of the present disclosure. Referring to FIG. 8, an autonomous parking managing method may include a step S810 of receiving, by the autonomous parking managing terminal 310, a vehicle control command from a user and transmitting the vehicle control command to an autonomous parking managing server 320, a step S820 of receiving, by the autonomous parking managing server 320, the vehicle control command from the autonomous parking managing terminal 310 and transmitting the received vehicle control command to the vehicle 330, and a step S830 of performing, by the vehicle 330, parking via autonomous driving based on the vehicle control command.

For example, the step S810 of receiving, by the autonomous parking managing terminal 310, of the vehicle control command from the user and transmitting the vehicle control command to the autonomous parking managing server 320 may include receiving, by the autonomous parking managing terminal 310, one or more of a tap or a swipe from the user via a touch screen and transmitting the vehicle control command corresponding to one or more of the received tap or the received swipe to the autonomous parking managing server 320.

As another example, the step S810 of receiving, by the autonomous parking managing terminal 310, of the vehicle control command from the user and transmitting the vehicle control command to the autonomous parking managing server 320 may include detecting a hand signal of the user based on acceleration obtained via an acceleration sensor and transmitting the vehicle control command corresponding to the hand signal to the autonomous parking managing server 320. For example, the step S830 of performing, by the vehicle 330, parking via autonomous driving based on the vehicle control command may include performing one or more of forward control, reverse control, steering control, or stop control.

For example, the autonomous parking managing method may further include transmitting, by the autonomous parking managing terminal 310, a control right request for the vehicle 330 received from the user to the autonomous parking managing server 320, transmitting, the autonomous parking managing server 320, the control right request received from the autonomous parking managing terminal 310 to the vehicle 330, transmitting, by the autonomous parking managing server 320, approval for the control right request received from the vehicle 330 to the autonomous parking managing terminal 310, and activating, by the autonomous parking managing terminal 310, an input of a vehicle control command from the user when the autonomous parking managing terminal 310 receives the approval for the control right request from the autonomous parking managing server 320. For example, the autonomous parking managing method may further include extracting, by autonomous parking managing terminal 310, a vehicle number from an image the vehicle 330 captured by the user via a camera and receiving the control right request for the vehicle 330 corresponding to the vehicle number.

The operations of the method or algorithm described in connection with the embodiments disclosed in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Descriptions of an autonomous parking managing terminal apparatus according to an embodiment of the present disclosure, a system having the same, and a method thereof are as follows.

According to at least one of embodiments of the present disclosure, it is possible to provide a terminal apparatus for remotely controlling autonomous parking, a system including the same, and a method thereof. Furthermore, according to at least one of embodiments of the present disclosure, it is possible to provide an autonomous parking managing terminal apparatus for controlling more accurate parking in a hub of an autonomous driving truck, a system including the same, and a method thereof.

Moreover, according to at least one of embodiments of the present disclosure, it is possible to provide an autonomous parking managing terminal apparatus, which is capable of completing parking without switching to manual operation or boarding a driver even in arbitrary or emergency situations during parking, a system including the same, and a method thereof. Additionally, according to at least one of embodiments of the present disclosure, it is possible to provide an autonomous parking managing terminal apparatus that maximally reduces transportation costs by minimizing the driver's boarding during autonomous parking of an autonomous driving truck in a hub, a system including the same, and a method thereof.

Besides, according to at least one of embodiments of the present disclosure, it is possible to provide an autonomous parking managing terminal apparatus that automates parking of autonomous driving trucks based on vision or communication in a restricted area (space without dependence on map/GPS signals), a system including the same, and a method thereof. Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous parking managing terminal apparatus, the apparatus comprising:
    a communication circuit configured to communicate with an autonomous parking managing server; and
    a processor, wherein the processor is configured to:
       receive a control right request for a vehicle from a user;
       transmit the control right request for the vehicle to the autonomous parking managing server via the communication circuit;
       receive approval for the control right request from the autonomous parking managing server;
       receive a vehicle control command from the user; and
       transmit the vehicle control command to the autonomous parking managing server via the communication circuit.

2. The apparatus of claim 1, further comprising:
    a camera,
    wherein the processor is configured to extract a vehicle number from an image of the vehicle, captured using the camera, and receive the control right request for the vehicle corresponding to the vehicle number.

3. The apparatus of claim 1, wherein the processor is configured to receive a target location, to which the vehicle is to be moved on a map, from the user and transmit information about the target location to the autonomous parking managing server via the communication circuit.

4. The apparatus of claim 1, further comprising:
    a touch screen,
    wherein the processor is configured to receive an input from the user via the touch screen and transmit the vehicle control command corresponding to the received input to the autonomous parking managing server via the communication circuit.

5. The apparatus of claim 1, further comprising:
an acceleration sensor,
wherein the processor is configured to detect a hand signal of the user based on acceleration obtained via the acceleration sensor, and transmit the vehicle control command corresponding to the hand signal to the autonomous parking managing server via the communication circuit.

6. The apparatus of claim 1, wherein the vehicle control command includes a control command corresponding to one or more of forward control, reverse control, steering control, and stop control.

7. An autonomous parking managing system, the system comprising:
an autonomous parking managing terminal configured to receive a vehicle control command from a user and to transmit the vehicle control command to an autonomous parking managing server;
the autonomous parking managing server configured to receive the vehicle control command from the autonomous parking managing terminal and to transmit the received vehicle control command to a vehicle; and
the vehicle configured to perform parking via autonomous driving based on the vehicle control command.

8. The system of claim 7, wherein:
the autonomous parking managing terminal is configured to transmit a control right request for the vehicle, which is received from the user, to the autonomous parking managing server, and activate an input of the vehicle control command from the user when receiving approval for the control right request from the autonomous parking managing server, and
wherein the autonomous parking managing server is configured to transmit the control right request received from the autonomous parking managing terminal to the vehicle, and transmit approval for the control right request received from the vehicle to the parking managing terminal.

9. The system of claim 8, wherein the autonomous parking managing terminal is configured to extract a vehicle number from an image of the vehicle, captured a camera, and receive the control right request for the vehicle corresponding to the vehicle number.

10. The system of claim 7, wherein the autonomous parking managing terminal is configured to receive a target location, to which the vehicle is moved on a map, from the user and transmit information about the target location to the autonomous parking managing server.

11. The system of claim 7, wherein the autonomous parking managing terminal is configured to receive an input from the user via a touch screen, and transmit the vehicle control command corresponding to the received input to the autonomous parking managing server.

12. The system of claim 7, wherein the autonomous parking managing terminal is configured to detect a hand signal of the user based on acceleration obtained via an acceleration sensor, and transmit the vehicle control command corresponding to the hand signal to the autonomous parking managing server.

13. The system of claim 7, wherein the vehicle control command includes a control command corresponding to one or more of forward control, reverse control, steering control, and stop control.

14. The system of claim 8, wherein the vehicle is configured to receive the control right request from the autonomous parking managing server, transmit approval for the control right request to the autonomous parking managing server, and enter a state of waiting for the vehicle control command.

15. An autonomous parking managing method, the method comprising:
receiving, by an autonomous parking managing terminal, a vehicle control command from a user and transmitting the vehicle control command to an autonomous parking managing server;
receiving, by the autonomous parking managing server, the vehicle control command from the autonomous parking managing terminal and transmitting the received vehicle control command to a vehicle; and
performing, by the vehicle, parking via autonomous driving based on the vehicle control command.

16. The method of claim 15, further comprising:
transmitting, by the autonomous parking managing terminal, a control right request for the vehicle, which is received from the user, to the autonomous parking managing server;
transmitting, by the autonomous parking managing server, the control right request received from the autonomous parking managing terminal to the vehicle;
transmitting, by the autonomous parking managing server, approval for the control right request received from the vehicle to the parking managing terminal; and
activating, by the autonomous parking managing terminal, an input of the vehicle control command from the user, when the autonomous parking managing terminal receives the approval for the control right request from the autonomous parking managing server.

17. The method of claim 16, further comprising:
extracting, by the autonomous parking managing terminal, a vehicle number from an image of the vehicle, which is captured by the user via a camera and receiving the control right request for the vehicle corresponding to the vehicle number.

18. The method of claim 15, further comprising:
receiving, by the autonomous parking managing terminal, a target location, to which the vehicle is to be moved on a map, from the user and transmitting information about the target location to the autonomous parking managing server.

19. The method of claim 15, wherein the receiving, by the autonomous parking managing terminal, of the vehicle control command from the user and transmitting the vehicle control command to the autonomous parking managing server includes:
receiving, by the autonomous parking managing terminal, an input from the user via a touch screen and transmitting the vehicle control command corresponding to the received input to the autonomous parking managing server.

20. The method of claim 15, wherein the receiving, by the autonomous parking managing terminal, of the vehicle control command from the user and transmitting the vehicle control command to the autonomous parking managing server includes:
detecting a hand signal of the user based on acceleration obtained via an acceleration sensor; and
transmitting the vehicle control command corresponding to the hand signal to the autonomous parking managing server.

* * * * *